Aug. 19, 1958
J. T. FISHER
2,848,657
OVERHEAT SAFETY DEVICE
Filed Oct. 20, 1953
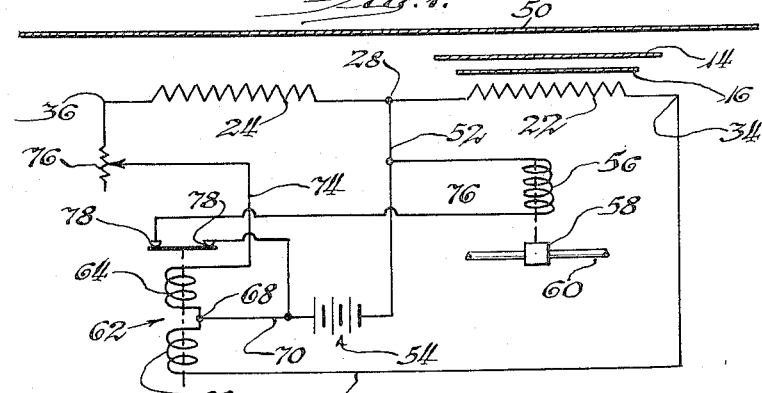
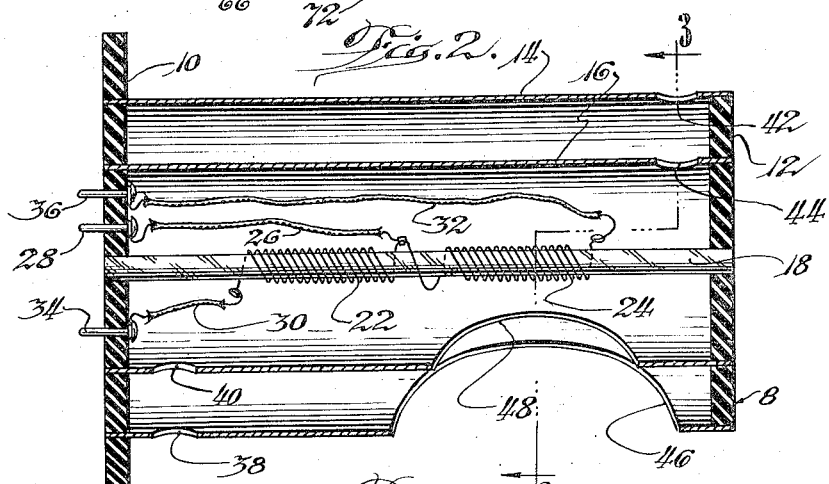
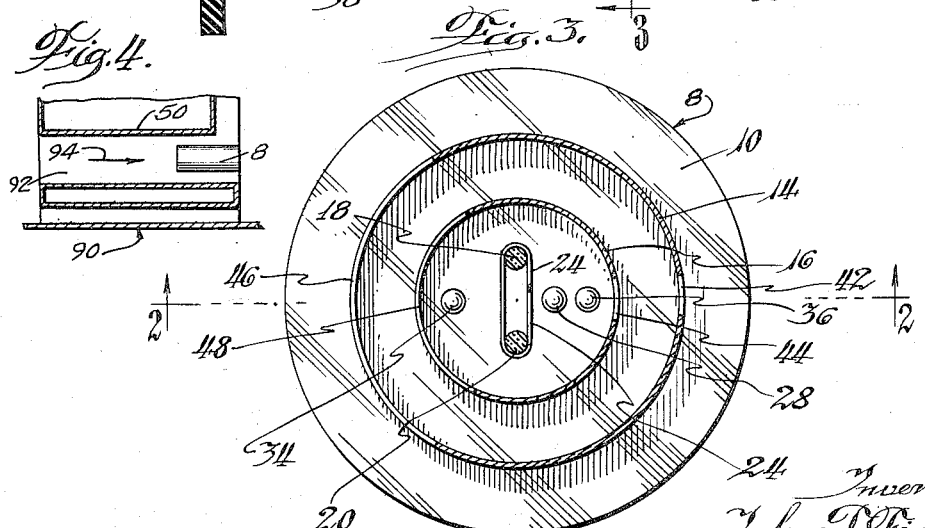
Inventor:
John T. Fisher
By Ahlberg, Wupper, & Gradolph
Attorneys

United States Patent Office 2,848,657
Patented Aug. 19, 1958

2,848,657

OVERHEAT SAFETY DEVICE

John T. Fisher, Indianapolis, Ind., assignor to Stewart-Warner Corporation, Chicago, Ill., a corporation of Virginia Application October 20, 1953, Serial No. 387,213

1 Claim. (Cl. 317—132)

The present invention relates to the problem of preventing overheating of structure within combustion air heaters which is subject to damage under abnormal operating conditions by excessive temperatures.

One object is to provide for a combustion air heater improved, extremely economical safety control means which affords to internal air heating structure of the heater superior protection from overheating under abnormal operating conditions.

Other objects and advantages will become apparent from the following description of a preferred embodiment of my invention.

In the drawings, in which similar characters of reference are used to designate similar parts throughout the several views—

Fig. 1 is an electrical circuit diagram illustrating a typical circuit arrangement for practicing the present invention;

Fig. 2 is a longitudinal medial section through one example of the overheat sensing unit of the present invention;

Fig. 3 is a transverse sectional view which may be considered as taken in the direction of the arrows along the line 3—3 of Fig. 2; and Fig. 4 is a schematic view on a greatly reduced scale showing in a fragmentary sectional illustration of a combustion heater the heat sensing unit positioned in an internal air passage of the heater.

In many heater applications it is desirable to provide automatic safety equipment for turning off the fuel supply to the heater in the event that the heater overheats. One difficulty with currently available equipment for this purpose, particularly with hot air heaters, is that during normal operation of the heater the temperature of the air being heated and the temperature of the heat exchanger fluctuates considerably. This causes difficulty if ordinary thermostatic overheat switches of the type which are sensitive to the temperature of the ventilating air are used, and a further difficulty is encountered under conditions where the source of supply of the ventilating air, for instance a blower, may fail. Under such conditions the temperature of the heat exchanger will rise extremely rapidly to an unsafe level, but the temperature of the air downstream of the heat exchanger where the thermostat is located may not rise appreciably inasmuch as the ventilating air is not moving. Frequently, therefore, an unsafe condition can arise which is not sensed quickly enough by an ordinary thermostatic element which is responsive to the temperature of the ventilating air.

The device of the present invention overcomes these problems by providing an arrangement which is substantially insensitive to variations in the temperature of the ventilating air stream and which responds only when the metal of the heat exchanger itself is overheated. Inasmuch as the device is insensitive to air temperature its sensing element may conveniently be placed within the ventilating air duct. It is necessary merely that it be placed relatively close to some heat exchange surface which will rise in temperature rapidly under overheat conditions. It will be appreciated that there is ordinarily no problem in finding an appropriate location in or on a heater satisfying these requirements.

Referring now to Figs. 2, 3 and 4 of the drawings, the sensing element or unit 8 there shown comprises a double envelope formed by a spaced parallel pair of discs or end plates 10 and 12 and which support two concentric spaced apart metal tubes or shells 14 and 16. As shown, one of these discs 10 is larger than the other to provide a flange for mounting the element. At the center of the smaller tube 16 there are a pair of parallel insulating support rods 18 and 20 with their ends supported in the end plates or discs 10 and 12. Preferably the support rods 18 and 20 should be formed of an insulating material which is stable at relatively high temperatures. Pyrex glass, ceramics and other substances which will suggest themselves are suitable for this purpose. Two uninsulated coils 22 and 24 are wound about the support rods 18 and 20 so that the turns of these coils are air spaced from each other. These coils are formed of small wire having a high temperature coefficient of resistance so that the resistance of the coils changes considerably with temperature change. The coils are substantially identical as to their electrical and physical characteristics and are connected together at their adjacent ends and this common end is connected to a lead 26 extending to a terminal 28 in the end disc 10. The free ends of the coils 22 and 24 are similarly connected to leads 30 and 32, respectively, which are connected in turn to terminals 34 and 36 adjacent to the terminal 28. If desired, these three terminals may be in the form of pins which are properly located to be embraced by a quick disconnect jack of suitable type. As shown, the end plate 10 is formed of insulating material and the terminals are mounted directly thereon, but if desired this plate, and of course the plate 12, may be formed of metal and the terminals 28, 36 and 34 can be insulated from the plate 10 in any well known manner.

In order to permit free air circulation around the coils 22 and 24, the tubes 14 and 16 are provided with aligned openings 38 and 40, respectively, at a position just inside the end plate 10. Near the opposite end of the unit 8 a similar set of openings 42 and 44 are provided at the opposite side of the unit. As shown in Figs. 1 and 4, the sensing unit 8 is positioned within a combustion air heater 90 of generally conventional construction in spaced opposing relation to structure 50 of the heater which is heated by combustion to transmit heat to a stream of air, indicated by the arrow 94, flowing through passageway space 92 formed in the heater adjacent the structure 50. Actually the unit 8 is placed in the hot air stream 94 in the passageway space 92 and oriented so that the dynamic effect of the moving air will cause hot air to flow in through the openings 38 and 40, across and through the coils 22 and 24, and out through the openings 44 and 42 so as to rejoin the main ventilating air stream. The openings 38—40 and 42—44 are so located with respect to the coils 22 and 24 that no appreciable portion of these coils can be seen through these openings.

In addition to the openings just described, each of the tubes 14 and 16 is provided with a large opening 46 and 48, respectively. These two openings are in register and are opposite one of the flat sides of the coil 24.

The sensing unit 8, with reference to Figs. 1 and 4, is located with the openings 46 and 48 facing the structure 50 which can be depended upon to heat quickly to a relatively high temperature in the event that an unsafe overheat condition arises. Thus the tubes 14 and 16 and the radial air space between the tubes serve to shield and insulate the coil 22 from any radiant energy from the hot heat exchanger surface. On the other hand the large cutout openings 46 and 48 permit radiation from the heat exchanger to fall upon the coil 24 so as to raise the temperature of this coil above that of the coil 22. Inasmuch as the wire of this coil is relatively fine and has low mass, it will of course heat quickly.

Referring now to Fig. 1 of the drawings, the coils 22 and 24 are diagrammatically illustrated and have been indicated by the same numerals. In this figure the metal surface of the heat exchanger is indicated diagrammatically at 50 while the baffle tubes 14 and 16 are designated by the same numerals as in Figs. 2 and 3. The terminal 28 which is common to both coils 22 and 24 is connected by a lead 52 to one side of a source of electric power indicated by the battery at 54. This lead 52 is also connected to one terminal of the actuating coil 56 of a normally closed electrically opened valve 58. This valve is in the fuel line 60 which supplies the heater burner. Thus whenever the coil 56 is energized fuel can flow and the burner can operate, but deenergization of the coil 56 turns off the burner.

At 62 I have indicated a balanced opposed winding micro-relay which is of the single pole, single throw, normally closed type. This relay has two actuating coils 64 and 66 which have a common terminal 68 connected by a lead 70 to the battery 54 on the side opposite that to which the lead 52 is connected. The opposite end of relay coil 66 is connected by a lead 72 to the previously mentioned terminal 34 on the sensing element, whereas the free end of the coil 64 is connected by a lead 74 through a low resistance variable trimming resistor 76 to the previously mentioned terminal 36 on the sensing element. As previously mentioned, one end of the coil 56 for the fuel valve 58 is connected to one side of the battery represented by the lead 52. The other side of this coil indicated by the lead 76 is connected through the normally closed relay contacts 78 to the other side of the battery at lead 70.

The direction of winding of the coils 64 and 66 is such that whenever the current in the circuit from the battery 54 through the coil 66 and wire wound resistor 22 is substantially the same as the current in the circuit from the battery by way of the relay coil 64 and resistors 76 and 24, the magnetic fields of the coils 64 and 66 will cancel so as to permit the relay contacts 78 to remain closed. On the other hand, a comparatively small unbalance in the currents in the coils 66 and 64 will produce a resultant magnetic effect which will operate the relay to separate the contacts 78. The relay 62 and the contact 78 together form a differential relay switch.

When the device is placed in operation the resistor 76 is adjusted so that the currents in the coils 64 and 66 are substantially the same when the coils 24 and 22 are at substantially the same temperature. In some particular embodiments of this invention it may be advisable to insert a small valve fixed resistor in the lead 72 in order to accomplish this, although usually a slightly greater resistance in the coil 22 will accomplish the same objective. Thereafter, any fluctuation in the temperature of the air passing through and around the coils 22 and 24 will cause an equal fluctuation in the temperatures of the coils 22 and 24 with the result that although the current flow in the coils 64 and 66 will increase or decrease, these currents will be substantially the same and hence the magnetic effect upon the relay armature will remain at substantially zero. Therefore, regardless of temperature fluctuation of the hot air through the heater, the relay contacts 78 remain closed and the coil 56 of the fuel valve 58 remains energized, thereby insuring an adequate supply of fuel to the heater.

On the other hand, if a condition is reached in which the temperature of the metal of the heat exchanger rises unsafely, considerable radiation of heat from this metal surface will take place. Coil 22 is shielded from this radiation, but the temperature of the coil 24 is raised considerably. Under these conditions the resistance of the coil 24 will be considerably greater than the resistance of the coil 22. The result of this is that the current flow through the coil 66 will exceed that through the coil 64. Under these unbalanced conditions the armature of the relay is attracted and relay contacts 78 are separated, thereby deenergizing the fuel valve coil 56 and shutting off the flow of fuel to the heater.

Ordinarily, when the circuit is so adjusted that the currents in the coils 64 and 66 are equal under safe operating conditions, the relay contacts 78 will reclose as soon as the temperature of the heat exchange surface 50 has dropped below the point at which substantial radiation therefrom takes place. Under these conditions the fuel valve 58 will reopen, thereby reestablishing the supply of fuel to the heater. On the other hand, if desired, the resistor 76 can be so adjusted that there is a slight unbalanced condition under safe operating conditions such that the current in the coil 66 is slightly greater than the current in the coil 64. If this is properly done, the resultant magnetic flux thus produced will not be sufficient to open the relay contacts 78 under ordinary operating conditions of the heater, but in the event that an unsafe condition has arisen and the relay has once actuated to separate these contacts, there will be a sufficient unbalance in the relay coils to maintain the relay in open position even after a safe condition has again been reached. With the circuit adjusted in this fashion, it will be necessary to reclose the relay manually before restarting the heater.

From the above description of a preferred embodiment of my invention it will be appreciated that variations from the specific disclosures may be made without departing from the scope of the invention which is to be measured by the scope of the following claim.

Having described my invention, what I claim as new and useful and desire to secure by Letters Patent of the United States is:

A safety device for preventing overheating of a combustion air heater component, comprising, in combination, an envelope adapted to be mounted in spaced opposing relation to a heater component within heater space through which a passing stream of air is heated from the heater component, said envelope including two elongated heat shielding shells disposed in mutually spaced relation one within the other, two electrical resistors mounted within the inner shell in spaced relation to each other and having high temperature coefficients of resistance, said respective shells defining alined openings therein dimensioned and located with respect to said resistors to expose only one of the resistors to radiant heat from the heater component the other resistor being shielded by said envelope from radiant heat from external sources, said envelope being pierced by openings communicating with the interior of said inner shell on opposite sides of said resistors and oriented with respect to the envelope to circulate a portion of an ambient air stream through the envelope around both resistors, a heater control circuit including a safety switch, and electrical operating means for said switch connected with said respective resistors and balanced therewith to operate said switch in response to a predetermined change in the resistance values of the resistors relative to each other due to differential heating of the resistors.

(References on following page)

References Cited in the file of this patent

UNITED STATES PATENTS

| | | |
|---|---|---|
| 1,059,971 | Beighlee | Apr. 29, 1913 |
| 1,099,199 | Parker | June 9, 1914 |
| 1,953,244 | Luckey | Apr. 3, 1934 |
| 2,021,573 | Alder | Nov. 19, 1935 |
| 2,139,504 | King | Dec. 6, 1938 |
| 2,247,539 | Winfield | July 1, 1941 |
| 2,349,436 | Keeler | May 23, 1944 |
| 2,403,843 | Beam | July 9, 1946 |
| 2,414,488 | Shanck | Jan. 21, 1947 |
| 2,556,065 | Callender | July 5, 1951 |
| 2,598,808 | Ledin | June 3, 1952 |
| 2,602,591 | Wilson | July 8, 1952 |
| 2,666,089 | Gier | Jan. 12, 1954 |